(12) United States Patent
Kaiser et al.

(10) Patent No.: US 11,441,473 B2
(45) Date of Patent: Sep. 13, 2022

(54) CLAMPLESS TAIL PIPE ASSEMBLY

(71) Applicant: AMG Industries, LLC, Mount Vernon, OH (US)

(72) Inventors: Dirk K. Kaiser, Sunbury, OH (US); Doug A. Spangler, Galena, OH (US); Les S. Griswold, Traverse City, MI (US); Dragan Maric, Grand Rapids, MI (US)

(73) Assignee: AMG Industries, LLC, Mount Vernon, OH (US)

( * ) Notice: Subject to any disclaimer, the term of this patent is extended or adjusted under 35 U.S.C. 154(b) by 244 days.

(21) Appl. No.: 16/799,262

(22) Filed: Feb. 24, 2020

(65) Prior Publication Data

US 2021/0262377 A1    Aug. 26, 2021

(51) Int. Cl.
*F01N 13/08* (2010.01)
*F16L 37/098* (2006.01)
*F01N 13/18* (2010.01)

(52) U.S. Cl.
CPC ....... *F01N 13/082* (2013.01); *F01N 13/1805* (2013.01); *F16L 37/098* (2013.01)

(58) Field of Classification Search
CPC ... F01N 13/082; F01N 13/1805; F16L 37/098
See application file for complete search history.

(56) References Cited

U.S. PATENT DOCUMENTS

| | | | | |
|---|---|---|---|---|
| 2,771,908 | A * | 11/1956 | Wilson | F01N 13/082 285/223 |
| 3,642,094 | A * | 2/1972 | Yancey | F01N 1/084 181/245 |
| 6,910,506 | B2 * | 6/2005 | Gabriel | F01N 13/08 138/109 |
| 7,874,150 | B2 | 1/2011 | Stadler et al. | |
| 8,550,122 | B2 | 10/2013 | Derry et al. | |
| 9,346,350 | B2 | 3/2016 | Nowka et al. | |
| 9,926,828 | B2 | 3/2018 | Schwarz et al. | |
| 10,161,288 | B2 | 12/2018 | Laursen | |
| 10,227,050 | B2 | 3/2019 | Hodges | |
| 11,198,519 | B1 * | 12/2021 | Seeley | B64C 25/20 |
| 2004/0084247 | A1 * | 5/2004 | Kishida | F01N 13/08 181/227 |
| 2017/0009637 | A1 * | 1/2017 | Schwarz | F01N 13/082 |
| 2017/0022874 | A1 * | 1/2017 | Laursen | F16L 37/082 |

* cited by examiner

*Primary Examiner* — Anthony Ayala Delgado
(74) *Attorney, Agent, or Firm* — Tucker Ellis LLP; Heather M. Barnes

(57) ABSTRACT

A clampless tail pipe assembly may include a base having a longitudinal axis and spring elements spaced about the base. Each spring element may have a body with a first end and a second distal end. The second distal end may comprise a first inner locking tooth. The spring element body may include sequential proximate portions. A first portion may be connected to the base, substantially linear, and substantially parallel to the longitudinal axis. A second portion may be arcuate. A third portion may be substantially linear and substantially parallel to the longitudinal axis. A fourth portion may be angled relative to the longitudinal axis. A fifth portion may be angled relative to the longitudinal axis, and the angle may be different than the angle of the fourth portion relative to the longitudinal axis. A sixth portion may be angled relative to the longitudinal axis.

19 Claims, 5 Drawing Sheets

CLAMPLESS TAIL PIPE ASSEMBLY

BACKGROUND

Vehicle owners, especially those of trucks and specialty cars, take great pride in every detail in the appearance of the vehicle. One area is particular is tail pipe trim. Tail pipe trim, or tail pipes, are decorative trim disposed over an exhaust pipe for a more aesthetically pleasing look at the rear of the vehicle. Some tail pipe trim is directed to the visible exterior finish, such as chrome. In other instances, tail pipe trim may be the shape of the end, such as an angled exposed end and/or a rolled edge.

To secure a tail pipe to an exhaust pipe of the vehicles, it is known to use various means of attachment such as screw connections or pipe clamps. Connections between the tail pipe and the exhaust pipe may be visible. These attachments render the mounting of a tail pipe time consuming and complex. Issues may arise if there is improper alignment between the tail pipe and the exhaust pipe during installation. Care must be taken not to deform the tail pipe or exhaust pipe during installation, which may require effective tightening with the use of tools. It is desirable to provide a decorative tail pipe assembly that can be easily and effectively mounted onto an exhaust pipe that requires no additional fasteners and provide significant weight reduction through less components.

SUMMARY

A clampless tail pipe assembly may comprise a base having a longitudinal axis and a plurality of spring elements spaced about the base. Each spring element may comprise a spring element body having a first end and a second end distal from the first end. The second distal end may comprise a first inner locking tooth. The spring element body may comprise sequential proximate portions. A first portion may operably connect to the base, and the first portion may be substantially linear and substantially parallel to the longitudinal axis. A second portion may be proximate to the first portion, and the second portion may be arcuate. A third portion may be proximate the second portion, and the third portion may be substantially linear and substantially parallel to the longitudinal axis. A fourth portion may be proximate the third portion, and the fourth portion may be angled relative to the longitudinal axis. A fifth portion may be proximate the fourth portion, and the fifth portion may be angled relative to the longitudinal axis. The angle of the fifth portion may be different than the angle of the fourth portion relative to the longitudinal axis. A sixth portion may be proximate the fifth portion and may be angled relative to the longitudinal axis. The sixth portion may include the second distal end.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1A:
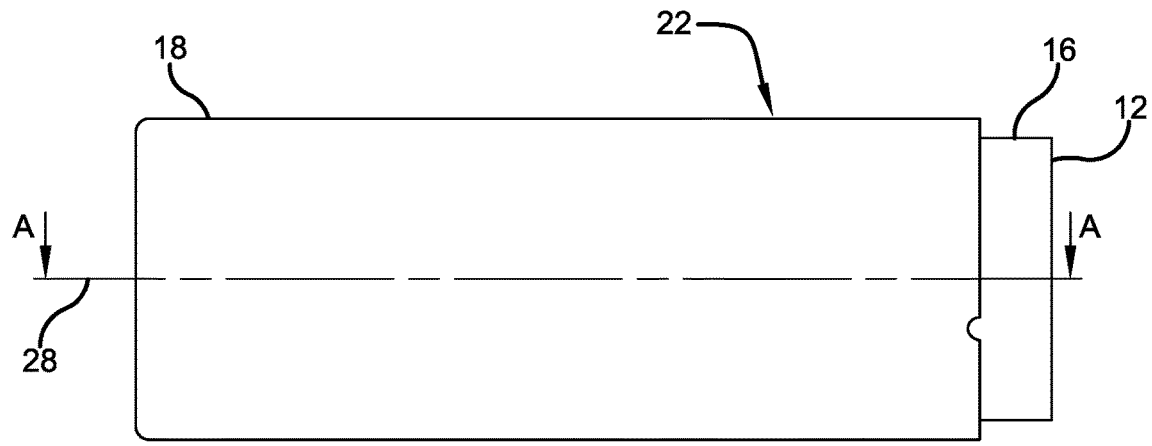
FIG. 1A is a front plan view of one implementation of a clampless tail pipe assembly.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

With reference to FIGS. 1A-1C and 2, a clampless pipe assembly 10 is shown. A clampless pipe assembly 10 may comprise an exhaust pipe 12, a tail pipe 18, and a tail pipe assembly 24 that may secure the tail pipe 18 to the exhaust pipe 12. The exhaust pipe 12 may comprise an inner surface 14 and an outer surface 16. The tail pipe 18, sometimes referred to in the industry as an optional decorative tip, may comprise an inner surface 20 and an outer surface 22. In one implementation, the tail pipe assembly 24 may be disposed at least partially inside the tail pipe 18. The tail pipe 18 and the tail pipe assembly 24 may then slide over the exhaust pipe 12 into an installed position. The tail pipe 18 may have a curved lip to add to the aesthetic appearance. The tail pipe assembly 24 may be in the installed position free of any additional fasteners, such as screws or rivets, but not limited thereto.

In one nonlimiting implementation, the outer surface 22 of the tail pipe 18 may be visible when viewing the rear side of a vehicle (not shown). As such, the user may desire the outer surface 22 of the tail pipe 18 to be decorative, such as with a selected finish, a certain geometry or a slanted end.

The tail pipe assembly 24 may comprise a base 26 having a longitudinal axis 28. The base 26 may take any shape chosen with sound engineering judgment. In one nonlimiting implementation, the base 26 may be may be ring shaped. In another nonlimiting example, the tail pipe assembly 24 may be at least partially disposed within the tail pipe 18. In another implementation, the tail pipe assembly 24 may be positioned completely or almost completely within the tail pipe 18.

The tail pipe assembly may further comprise a plurality of spring elements 30 spaced about the base 26. Each spring element 30 may comprise a spring element body 34. The spring element body 32 may have a first end 34 and a second end 36 distal from the first end 34. The second distal end 36 may comprise a first inner locking tooth 44. Each spring element body 32 may comprise a series of straight, arcuate and angled sections. In one implementation, the spring element body 32 may comprise a first portion 52 that is substantially linear and substantially parallel to the longitudinal axis 28. The first portion 52 may transition into a second portion 54, which is proximate the first portion 52. The second portion 54 may be arcuate. As the tail pipe assembly 24 goes from an uninstalled position, or relaxed position, to an installed position, the second portion 54 may extend, which may result in a greater angle than when in the uninstalled position. In the uninstalled position, the second portion may have an angle of about 65 degrees to 75 degrees. In another implementation, the angle may be about 70 degrees. Further in one example implementation, the radius of the second portion at location 54a may be between 0.15 and 0.25 inches or about 0.22 inches, 54b may be between about 0.75 inches to about 1.25 inches or about 1.04 inches, and 54c may be between 0.1 inches to about 0.25 inches or about 0.19 inches. In the installed position, the second portion 54 may stretch to an angle of 45 degrees, 90 degrees, and in one implementation 120 degrees or greater. The second portion 54 may transition into a third portion 56. The third portion 56 may be proximate the second portion 54. The third portion 56 may be substantially linear. The third portion 56 may be substantially parallel to the longitudinal axis 28. A fourth portion 58 may be proximate to the third portion 56. The fourth portion 58 may be substantially linear. The fourth portion 58 may be angled relative to the longitudinal axis 28. A fifth portion 60 may be proximate to the fourth portion 58. The fifth portion 60 may be angled relative to the longitudinal axis 28. The fifth portion 60 may be substantially linear. The angle of the fifth portion 60 may be different than the angle of the forth portion 58 relative to the longitudinal axis 28. The fifth portion 60 may transition to a sixth portion 62. The sixth portion 62 may be angled relative to the longitudinal axis 28.

Figure 1B:
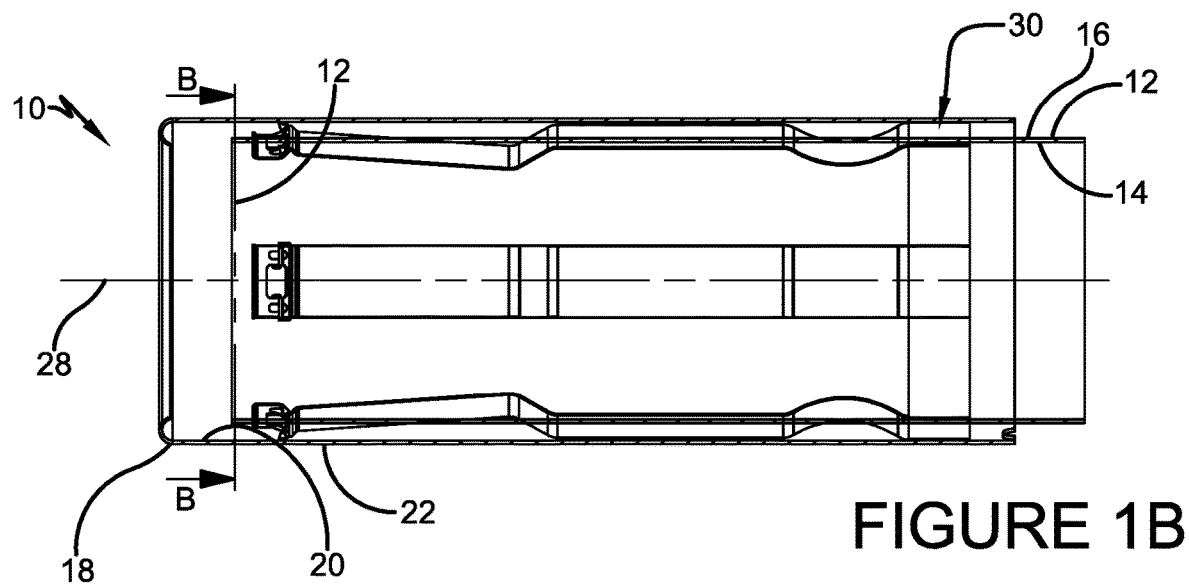
FIG. 1B is a sectional view taken along line A-A of FIG. 1.
Figure 1C:
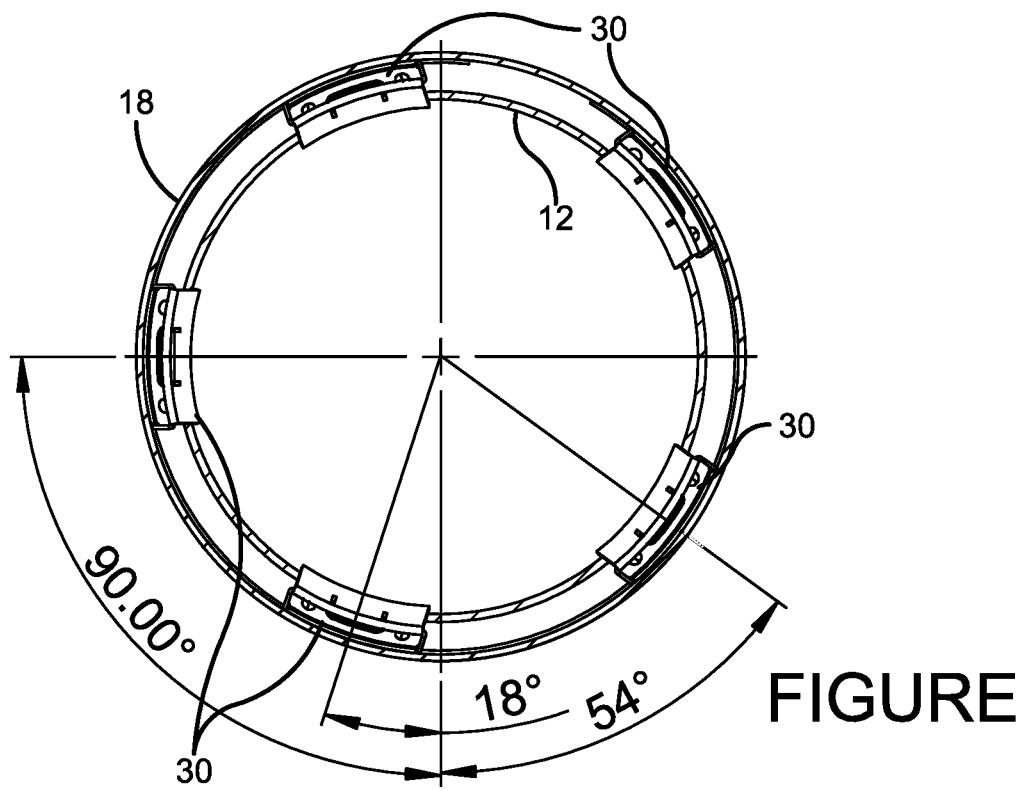
FIG. 1C is a left side view taken along line B-B of FIG. 1B.
Figure 2:
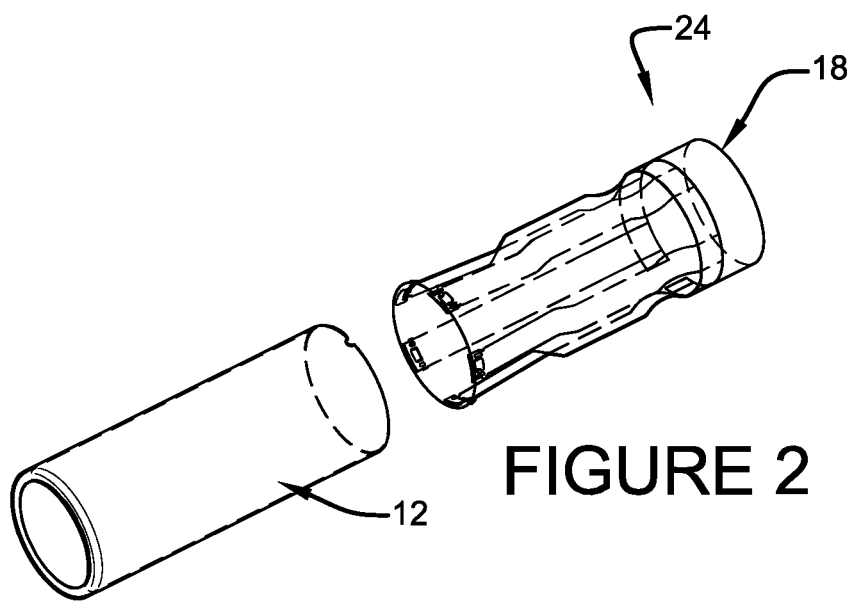
FIG. 2 is an exploded view of one implementation of a clampless tail pipe assembly.
Figure 3A:
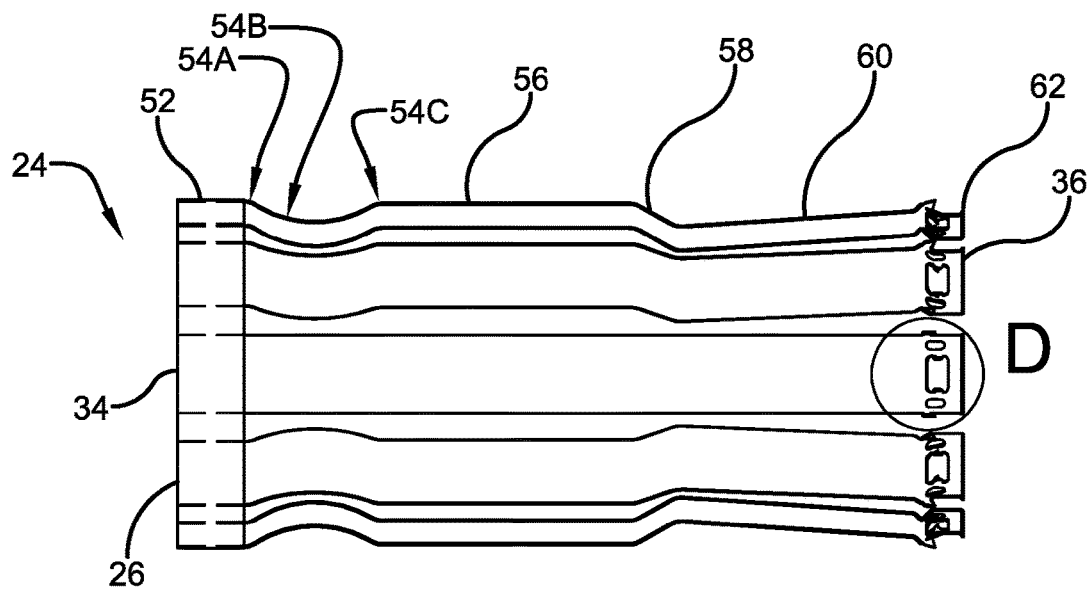
FIG. 3A is a perspective view of a component of a clampless tail pipe assembly.
Figure 3B:
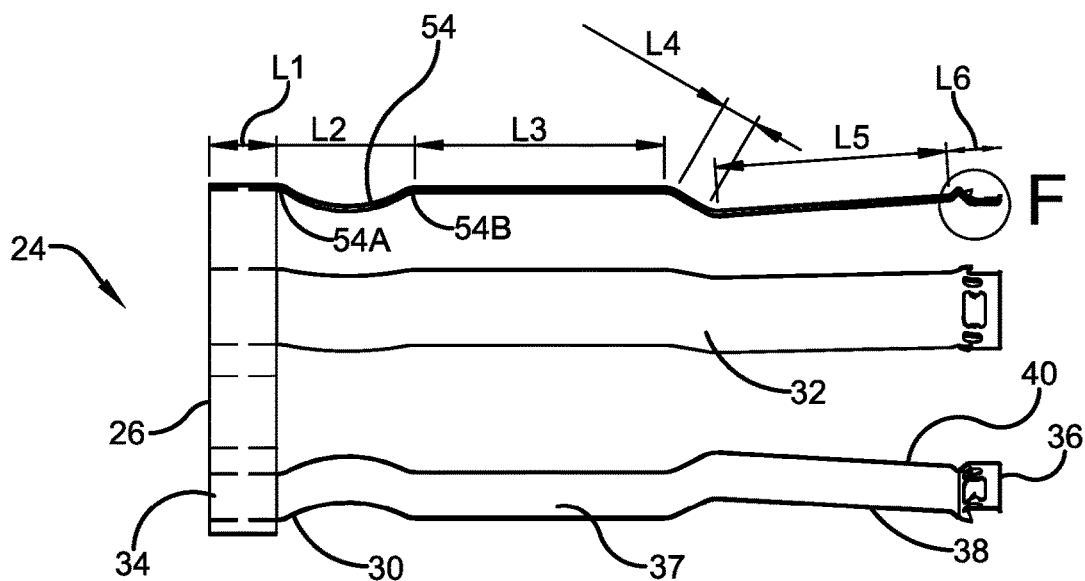
FIG. 3B is another perspective view of a component of a clampless tail pipe assembly shown in FIG. 3A.
Figure 3D:
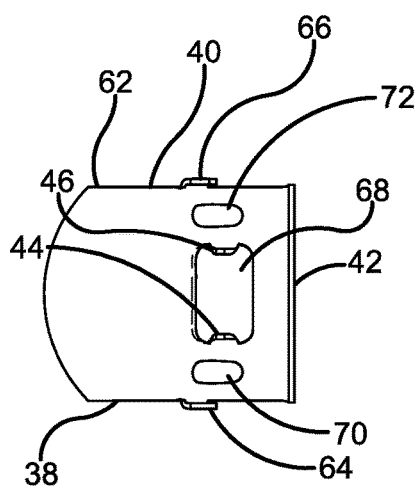
FIG. 3D is an enlarged view of detail D shown in FIG. 3A.
Figure 3C:
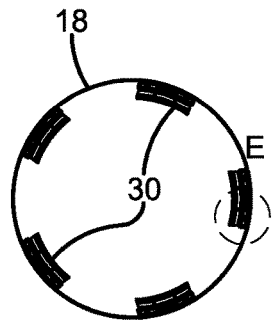
FIG. 3C is a left side view of FIG. 3A.
Figure 3E:
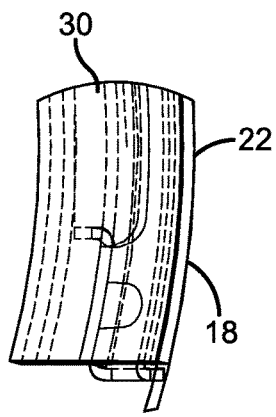
FIG. 3E is an enlarged view of detail E shown in FIG. 3C.
Figure 3F:
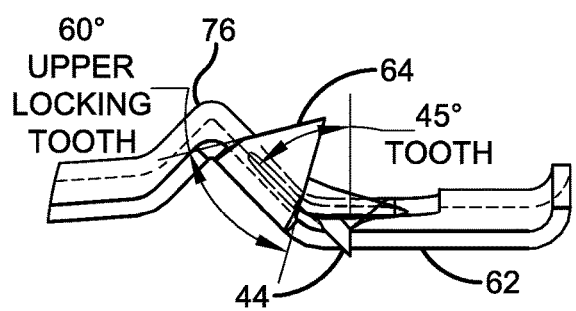
FIG. 3F is an enlarged view of detail F shown in FIG. 3B.

With continuing reference to FIGS. 1B, 3A, and 3B, each of the spring elements 30 may comprise a first elongated lateral edge 38 and a second elongated lateral edge 40. The second elongated lateral edge 42 may be substantially parallel to the first elongated lateral edge 38. A transverse edge 42 may be disposed between the first elongated lateral edge 38 and the second elongated lateral edge 40. The transverse edge 42 may not be visible between the exhaust pipe 12 and the tail pipe 18 when the tail pipe assembly 24 is in the installed position. Because the tail pipe assembly 24 is not visible in the installed position, the tail pipe assembly 24 does not detract from any decorative feature of the visible tail pipe 18.

Tail pipes 18 and exhaust pipes 12 may vary in length and diameter. As such, the overall length of the tail pipe assembly 24 and each of its portions may vary. In one nonlimiting implementation, the first portion 52 may have a length L1 that may be about 0.5 inches to about 0.75 inches. In another nonlimiting implementation, L1 may be about 0.6 to about 0.65 inches. In another nonlimiting implementation, the first portion 52 may be spot welded to the inner surface 20 of the tail pipe 18. In another implementation, some, but not all of the plurality of spring elements 30 may be spot welded or otherwise attached to the inner surface 20 of the tail pipe 18. In another implementation, each of the plurality of spring elements 30 may be spot welded or otherwise attached to the inner surface 20 of the tail pipe 18. The second portion 54 may have a length L2 that may be about 1.25 inches to about 1.5 inches. In another implementation, the length L2 may be about 1.3 to about 1.5 inches. In another implementation, the angle formed between each end 54a, 54c of the second portion 54 may be about 70 degrees. The third portion 56 may have a length L3 about 2.25 inches to about 2.5 inches in a nonlimiting implementation. In another example, L3 may be about 2.35 inches to about 2.4 inches. The forth portion 58 may have a length L4 of about 0.25 inches to about 0.5 inches, for example. In another implementation, L4 may be about 0.3 to about 0.35 inches. The forth portion 58 may form an angle α between 120 degrees and 175 degrees relative the third portion 56. The fifth portion 60 may have a length L5 of about 2 inches to about 2.25 inches in one nonlimiting implementation. In another example, L5 may be about 2.15 to about 2.22 inches. As shown in FIG. 3A, the fifth portion 60 may be angled relative to the longitudinal axis 28. In another implementation, the fifth portion 60 may form an angle relative to the forth portion 58, which may be about 140 to about 160 degrees. In another implementation, it may be about 147 degrees. The sixth portion 62 may have a length L6 about 0.5 inches to about 0.75 inches in one implementation. In another nonlimiting example, L6 may be about 0.6 to about 0.7 inches.

Figure 3G:
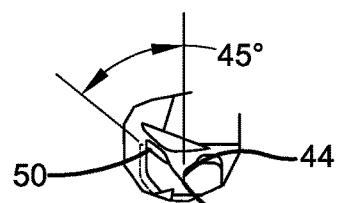
FIG. 3G is an enlarge view of detail P shown in FIG. 3A.

With reference to FIGS. 3B-3G and 4A-4C, the sixth portion 62 of the spring element 30 will be described in more detail. The sixth portion may comprise the first inner locking tooth 44 and a second inner locking tooth 46. The first inner locking tooth 44 and the second inner locking tooth 46 may be configured to impregnate the outer surface 16 of the exhaust pipe 12. The first inner locking tooth 44 and the second inner locking tooth 46 each may comprises a tooth tip 48 and a tooth root 50. As shown in FIG. 3G, the angle between the tooth tip 48 and the tooth root 50 may be about 45 degrees in one nonlimiting implementation. In another implementation, the angle between the tooth tip 48 and the tooth root 50 may be between 40 degrees and 50 degrees. The 45 degree angle between the tooth tip 48 and the tooth root may provide for greater engagement with the outer surface 16 of the exhaust pipe 12 so that the tail pipe assembly 24 remains in an installed position. In one nonlimiting implementation, only the first inner locking tooth 44 may be utilized to secure the tail pipe assembly 24 in the installed position.

The sixth portion 62 may also comprise a first opening 68 defined therein. A second opening 70 and a third opening 72 may also be defined in the sixth portion. The openings 68, 70, 72 may provide additional rigidity to the sixth portion 62 as it grips the exhaust pipe 12. The openings 68, 70, 72 may be any size chosen with sound engineering judgment. In one nonlimiting implementation, the first opening is larger than the second opening 70 and the third opening 72. In another implementation, the first inner locking tooth 44 and the second inner locking tooth 46 may be disposed about a perimeter of the first opening 68. In one nonlimiting implementation, the first opening 68 may be rectangular in shape. The first inner locking tooth 44 and the second inner locking tooth 46 may be disposed on opposite sides of the opening perimeter. In one example, the first inner locking tooth may be disposed on the perimeter side closest to the first elongated lateral edge 38 of the spring element body 32 and the second inner locking tooth may be disposed on the perimeter side closest to the second elongated lateral edge 40 of the spring element body 32.

With continuing reference to FIGS. 3B-3G and 4A-4C, the sixth portion 62 may further comprise a first outer locking tooth 64. The first outer locking tooth 64 may be disposed proximate or adjacent the first elongated lateral edge 38 of the spring element body 32. A second outer locking tooth 66 may be disposed proximate or adjacent the second elongated lateral edge 40 of the spring element body 32. The first outer locking tooth 64 and the second outer locking tooth 66 may be configured to impregnate the inner surface 14 of the tail pipe 18. In one implementation, the first outer locking tooth 64 may be configured to impregnate the inner surface 20 of the tail pipe 18 simultaneously with the first inner locking tooth 44 impregnating the outer surface 16 of the exhaust pipe 12.

It should be understood that any number of inner locking teeth and outer locking teeth may be utilized to secure the tail pipe 18 to the exhaust pipe 12. Further, any configuration of teeth may be utilized. In one implementation, only one inner locking tooth may be utilized. In another implementation, two inner locking teeth may be utilized. In other implementations, three or more locking teeth may be utilized. In other examples, only one outer locking tooth may be utilized. In other implementations, two locking teeth may be utilized. In other examples, three or more outer locking teeth may be utilized.

Figure 4B:
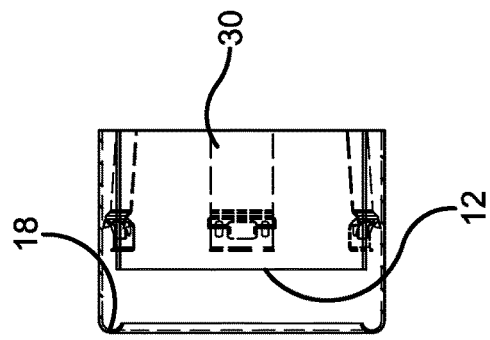
FIG. 4B is a cross section of FIG. 4A taken along line L-L.
Figure 4C:
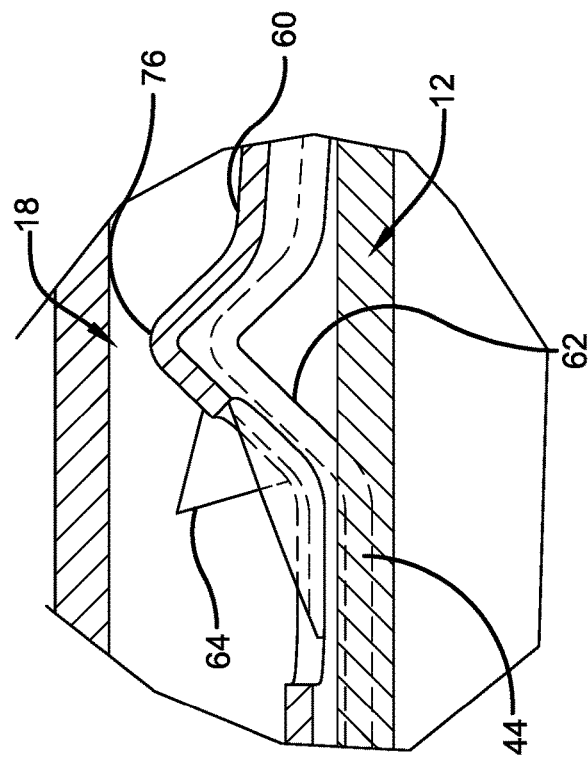
FIG. 4C is an enlarged view of detail M shown in FIG. 4B.
Figure 4A:
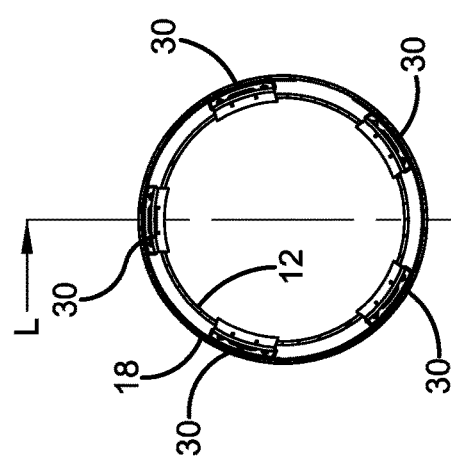
FIG. 4A is left side view of an implementation of a clampless pipe assembly.

With reference to FIG. 4C, the tail pipe assembly 24 is shown in dotted lines, in one example, before the tail pipe 18 is positioned over the exhaust pipe 12. The solid lines illustrate one example of the tail pipe assembly 24 in the installed position. A bend 76 may interconnect the fifth portion 60 and the sixth portion 62. In one example, when the tail pipe assembly 24 is in the installed position, the first inner locking tooth 44 may impregnate the outer surface 16 of the exhaust pipe. At the same time, a tip of the bend 76 may contact the inner surface 20 of the tail pipe. Engagement of the exhaust pipe 12 by the first inner locking tooth 44 and the tip of the bend 76 with the inner surface 20 of the tail pipe 18 may secure the tail pipe assembly 24 in the installed position.

When installing a tail pipe 18 onto the exhaust pipe 12 using the tail pipe assembly 24, the tail pipe assembly 24 is secured at least partially, completely, or substantially completely inside the tail pipe 18. The tail pipe assembly 24 is in a relaxed or installed position. The first portion 52 of each spring element 30 may be spot welded to the tail pipe 18. The tail pipe 18 then slides over the exhaust pipe 12. This places various forces on tail pipe assembly 24 causing it to stretch or elongate. As each of the spring elements 30 stretch and elongate between the tail pipe 18 and the exhaust pipe 12, the first inner locking tooth 44 impregnates the outer surface 16 of the exhaust pipe 12. Also, the tip of the bend 76 between the fifth portion 60 and the sixth portion 62 contacts the inner surface 20 of the tail pipe 18. In some implementations, once the tail pipe 18 is disposed over the exhaust 12 pipe placing the tail pipe assembly 24 in the installed position, the first inner locking tooth 44 and the second inner locking tooth 46 may impregnate the ouster surface 16 of the exhaust pipe 12. The first outer locking tooth 64 and the second outer locking tooth 66 may impregnate the outer surface 22 of the tail pipe 18. The tip of the bend 76 contacts the inner surface of the tail pipe 18. Also, the arcuate second portion 54 may be adequately stretched and apply forces to secure the tail pipe assembly 24 in the installed position between the exhaust pipe 12 and the tail pipe 18.

The tail pipe assembly 24 may be manufactured from any material chosen with sound engineering judgment. In one implementation, the tail pipe assembly 20 may be manufactured from metal. For example, the tail pipe assembly may be made of stainless steel, such as 304 stainless. In one nonlimiting example, the tail pipe assembly 20 may be made of any material that inhibits rust formation.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A tail pipe mounting assembly, comprising:
a base having a longitudinal axis; and
a plurality of spring elements spaced about the base, each spring element comprising a spring element body having a first end and a second end distal from the first end, the second distal end comprising a first inner locking tooth, the spring element body comprising:
a first portion substantially linear and substantially parallel to the longitudinal axis;
a second portion proximate the first portion, the second portion being arcuate;
a third portion proximate the second portion, the third portion being substantially linear and substantially parallel to the longitudinal axis;
a fourth portion proximate the third portion, the fourth portion being substantially linear and angled relative to the longitudinal axis;
a fifth portion proximate the fourth portion, the fifth portion being substantially linear and angled relative to the longitudinal axis, the angle of the fifth portion being different than the angle of the fourth portion relative to the longitudinal axis; and
a sixth portion proximate the fifth portion and being angled relative to the longitudinal axis, the sixth portion comprising the second distal end,
wherein the sixth portion further comprises a first outer locking tooth configured to impregnate the tail pipe, the first inner locking tooth configured to impregnate an outer surface of an exhaust pipe, the first outer locking tooth impregnating the tail pipe simultaneously with the first inner locking tooth impregnating the exhaust pipe.

2. The tail pipe mounting assembly of claim 1, wherein the sixth portion further comprises a second inner locking tooth, the second inner locking tooth configured to impregnate the outer surface of the exhaust pipe.

3. The tail pipe assembly of claim 1, further comprising:
a second inner locking tooth configured to impregnate the outer surface of the exhaust pipe; and
a second outer locking tooth configured to impregnate the tail pipe.

4. The tail pipe assembly of claim 3, wherein the first inner locking tooth and the second inner locking tooth are inwardly positioned relative to the first outer looking tooth and the second outer locking tooth.

5. The tail pipe assembly of claim 1, wherein the sixth portion comprises at least one opening defined therein, the first inner locking tooth extending from a perimeter edge of the opening.

6. The tail pipe assembly of claim 1, wherein the sixth portion comprises an inner surface, the first inner locking tooth comprising an angle of 40 degrees to 50 degrees from a tip of the first inner locking tooth and a tooth root.

7. The tail pipe assembly of claim 1, wherein the tail pipe assembly is free of fasteners to secure the tail pipe assembly between the tail pipe and the exhaust pipe.

8. The tail pipe assembly of claim 1, wherein each spring element comprises:
a first elongated lateral edge;
a second elongated lateral edge substantially parallel to the first elongated lateral edge; and
a transverse edge disposed between the first elongated lateral edge and the second elongated lateral edge, the transverse edge configured to not be visible between the exhaust pipe and the tail pipe when the tail pipe assembly is in an installed position.

9. The tail pipe assembly of claim 1, wherein the base is ring shaped.

10. The tail pipe assembly of claim 1, each spring element further comprises:
a first portion length of 0.5 inches to 0.75 inches;
a second portion length of 1.25 inches to 1.5 inches;
a third portion length of 2.25 inches to 2.5 inches;
a forth portion length of 0.25 inches to 0.5 inches;
a fifth portion length of 2 inches to 2.25 inches; and
a sixth portion length of 0.5 inches to 0.75 inches.

11. The tail pipe assembly of claim 1, wherein the second arcuate portion comprises a radius of 70 65 degrees to 75 degrees.

12. The tail pipe assembly of claim 1, wherein the plurality of spring elements is five.

13. A tail pipe mounting assembly, comprising:
a base having a longitudinal axis; and
a plurality of spring elements spaced about the base, each spring element comprising a spring element body having a first end and a second end distal from the first end, the spring element body comprising:
a first portion substantially linear and substantially parallel to the longitudinal axis;
a second portion proximate the first portion, the second portion being arcuate;
a third portion proximate the second portion, the third portion being substantially linear and substantially parallel to the longitudinal axis;
a fourth portion proximate the third portion, the fourth portion being angled relative to the longitudinal axis;
a fifth portion proximate the fourth portion, the fifth portion being angled relative to the longitudinal axis, the angle of the fifth portion being different than the angle of the fourth portion relative to the longitudinal axis; and
a sixth portion proximate the fifth portion and being angled relative to the longitudinal axis, the sixth portion comprising the second distal end, the sixth portion comprising the second distal end, a first inner locking tooth and a second inner locking tooth each configured to impregnate an exhaust pipe, and a first outer locking tooth and a second outer locking tooth each configured to impregnate a tail pipe.

14. The tail pipe mounting assembly of claim 13, wherein the base and the plurality of spring elements are disposed inside the tail pipe.

15. The tail pipe mounting assembly of claim 14, wherein the tail pipe is disposed over the exhaust pipe, the tail pipe mounting assembly disposed between the exhaust pipe and the tail pipe.

16. The tail pipe assembly of claim 13, wherein the sixth portion comprises at least one opening defined therein, the first inner locking tooth and the second inner locking tooth extending from a perimeter edge of the opening.

17. The tail pipe assembly of claim 13, further comprising a bend interconnecting the fifth portion and the sixth portion, wherein in an installed position, the first inner locking tooth and the second inner locking tooth impregnate an outer surface of the exhaust pipe and the first outer locking tooth, the second outer locking tooth and the bend contact an inner surface of the tail pipe.

18. The tail pipe assembly of claim 13, wherein the sixth portion comprises an inner surface, the first inner locking tooth comprising an angle of 45 degrees from a tip of the first inner locking tooth and a tooth root.

19. A tail pipe mounting assembly, comprising:
a base having a longitudinal axis; and
a plurality of spring elements spaced about the base, each spring element comprising a spring element body having a first end and a second end distal from the first end, the spring element body comprising:
a first elongated lateral edge;
a second elongated lateral edge substantially parallel to the first elongated lateral edge;
a transverse edge disposed between the first elongated lateral edge and the second elongated lateral edge;
a first portion substantially linear and substantially parallel to the longitudinal axis;
a second portion proximate the first portion, the second portion being arcuate;
a third portion proximate the second portion, the third portion being substantially linear and substantially parallel to the longitudinal axis;
a fourth portion proximate the third portion, the fourth portion being angled relative to the longitudinal axis;
a fifth portion proximate the fourth portion, the fifth portion being angled relative to the longitudinal axis, the angle of the fifth portion being different than the angle of the fourth portion relative to the longitudinal axis; and
a sixth portion proximate the fifth portion and being angled relative to the longitudinal axis, the sixth portion comprising the second distal end, the sixth portion comprising the second distal end, a first inner locking tooth and a second inner locking tooth each configured to impregnate an exhaust pipe, and a first outer locking tooth disposed on the first lateral edge and a second outer locking tooth disposed on the second lateral edge, the first outer locking tooth and the second outer locking tooth configured to impregnate a tail pipe, the sixth portion comprises at least one opening defined therein, the first inner locking tooth and the second inner locking tooth extending from a perimeter edge of the opening.

\* \* \* \* \*